Oct. 29, 1935. F. J. LOOMIS ET AL 2,019,147
SOUNDHEAD
Filed Oct. 14, 1932 7 Sheets-Sheet 1

INVENTOR
FRED J. LOOMIS
ELLWOOD W. REYNOLDS
BY
ATTORNEY

Oct. 29, 1935. F. J. LOOMIS ET AL 2,019,147
SOUNDHEAD
Filed Oct. 14, 1932 7 Sheets-Sheet 3
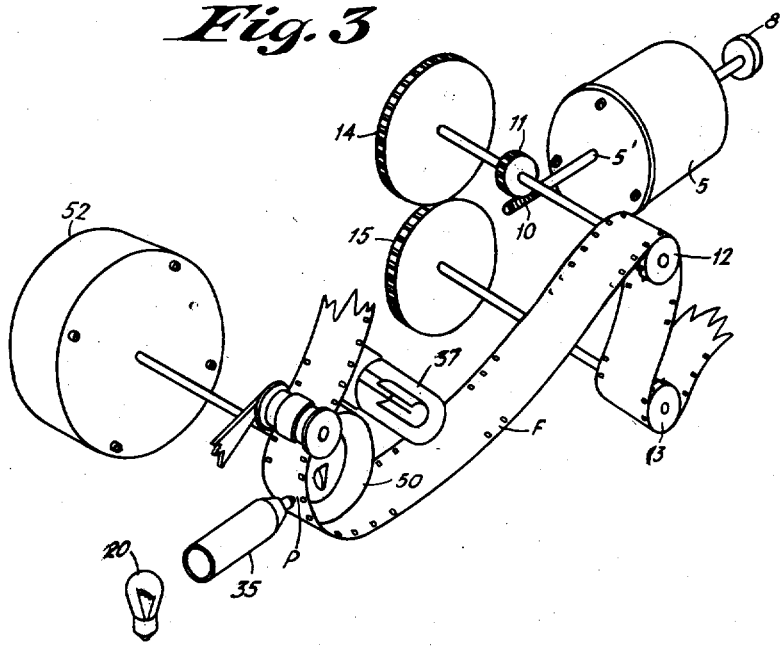
*Fig. 3*
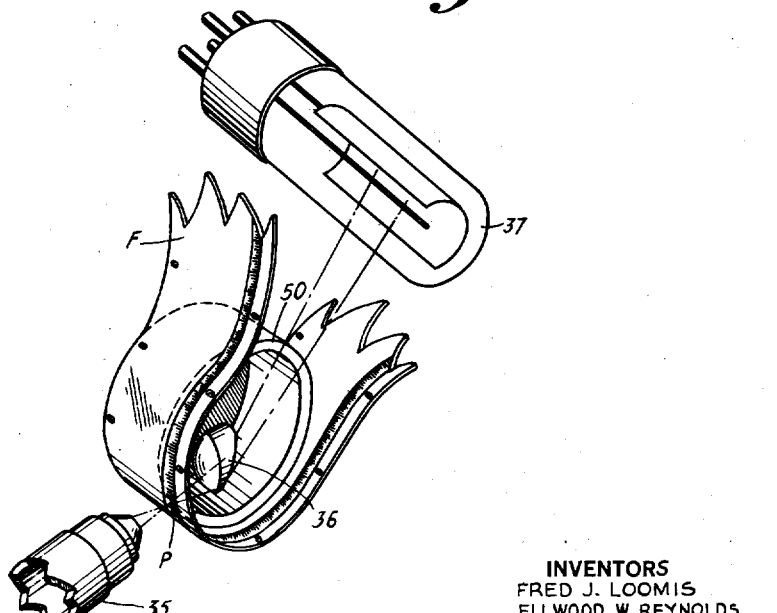
*Fig. 4*
INVENTORS
FRED J. LOOMIS
ELLWOOD W. REYNOLDS
BY 
ATTORNEY Oct. 29, 1935.　　F. J. LOOMIS ET AL　　2,019,147
SOUNDHEAD
Filed Oct. 14, 1932　　7 Sheets-Sheet 4

INVENTORS
FRED J. LOOMIS
BY ELLWOOD W. REYNOLDS
ATTORNEY

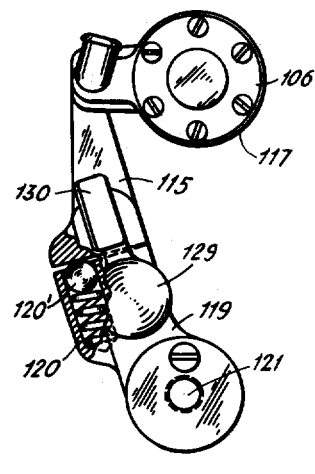
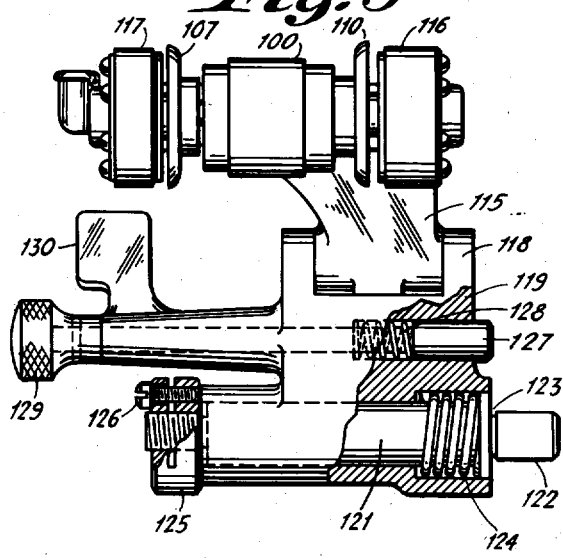
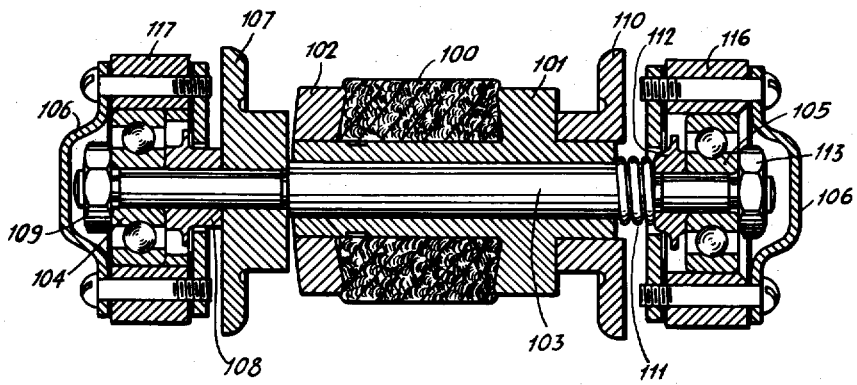

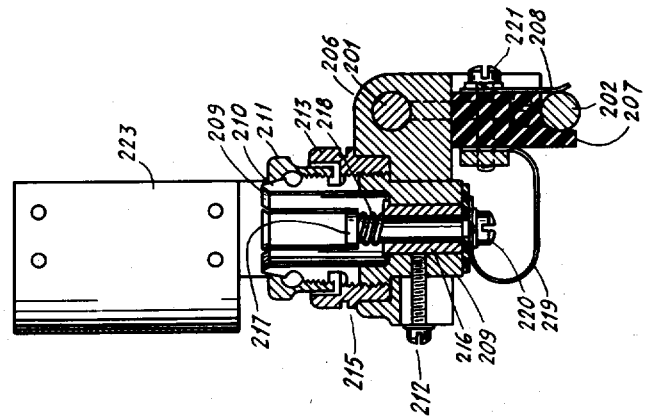
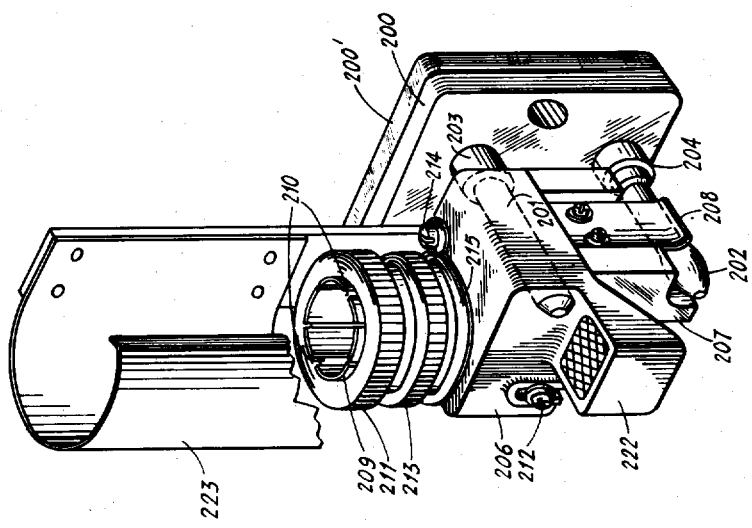

Oct. 29, 1935.　　　F. J. LOOMIS ET AL　　　2,019,147
SOUNDHEAD
Filed Oct. 14, 1932　　　7 Sheets-Sheet 7
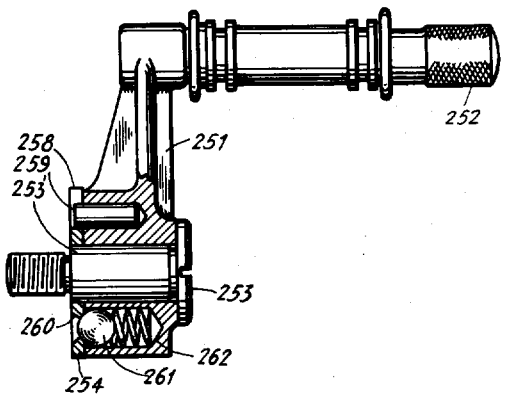
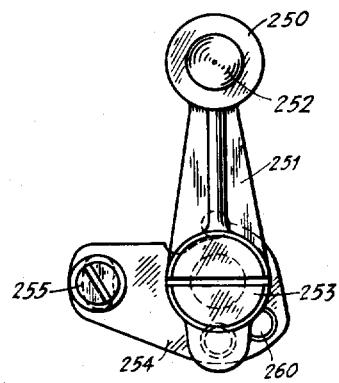
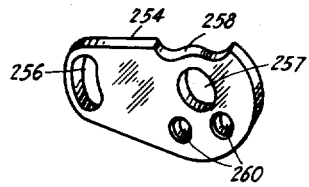
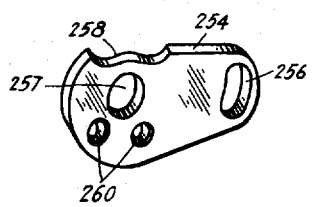
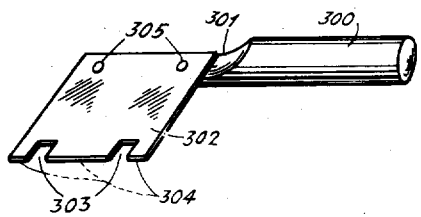
INVENTORS
FRED J. LOOMIS
ELLWOOD W. REYNOLDS
BY
ATTORNEY Patented Oct. 29, 1935

2,019,147

UNITED STATES PATENT OFFICE 2,019,147

SOUNDHEAD

Fred J. Loomis, Haddonfield, N. J., and Ellwood W. Reynolds, Drexel Hill, Pa., assignors to Radio Corporation of America, a corporation of Delaware Application October 14, 1932, Serial No. 637,852

19 Claims. (Cl. 179—100.3)

This invention relates to soundheads such as those adapted to be used in combination with motion picture apparatus for the purpose of producing talking motion pictures. It will be apparent, however, that its utility is by no means limited to such use.

It has for many years been customary in the talking picture art to provide a sound reproducing mechanism commonly known as a soundhead which is adapted for attachment to a motion picture projector and which is provided with a drive mechanism common to both the soundhead and the projector so that a single film carrying both the picture and sound records can be run consecutively through the two instrumentalities and sound can be reproduced from the film in exact synchronism with the pictures projected from the same film.

The soundhead ordinarily includes an exciter lamp, an optical system and a photoelectric cell, although any other desirable form of sound take-off may be used. The sound record moving mechanism may be mounted inside or exterior to the soundhead. Considerable difficulty has heretofore been encountered in the past due to the necessity for moving the film at an absolutely uniform speed past the sound reproduction point, the production of such uniform movement being rendered difficult because of the necessity of moving the film by means of sprockets cooperating with the sprocket holes therein, and because of irregularities in the operation of the driving mechanism and its attendant gearing.

Apparatus capable of moving the film or sound record at a uniform speed past the reproduction point under these conditions is disclosed in an application of Ellwood W. Reynolds, Serial No. 602,274 filed March 31, 1932. The present application relates to an improved soundhead similar in some respects to that disclosed in the aforesaid application but including additional features which have been found to be of great practical utility.

One object of the invention is the production of a soundhead which is adapted to cooperate with the standard types of motion picture apparatus and which is capable of such an extremely accurate movement of the film that a high degree of fidelity of the reproduced sound is realized.

Another object of the invention is the production of such a soundhead having greatest possible simplicity and lowest production cost.

Another object of the invention is the production of a soundhead having a minimum number of moving parts.

Another object of the invention is the production of a soundhead which will permit large manufacturing tolerances and at the same time produce a device having an extremely high degree of precision.

Another object of the invention is to provide a roller which will firmly hold the film in contact with the supporting drum at the reproduction point and guide it in a straight line laterally as it passes around the drum.

Another object of the invention is to provide a guide roller which will laterally guide any given standard width of film regardless of the shrinkage thereof.

Another object of the invention is to provide a guide roller whose frictional resistance to the film roller is small and whose variations to the resistance are negligible whereby it affects to the least possible extent the motion of the film drum.

Another object of the invention is to provide a lamp socket which will gently yet positively hold the exciter lamp in proper alignment with the optical system.

Another object of the invention is to provide a lamp socket which can be instantly and easily removed or replaced in exact position in the machine, thus allowing a burnt out exciter lamp to be instantly replaced by a new one without requiring readjustment of the optical system.

Another object of the invention is to provide a lamp socket having mechanical characteristics which give it sufficient flexibility to prevent microphonic noises from the lamp, and at the same time sufficient stiffness to hold the filament in correct position.

Another object of the invention is to provide an extremely simple and dependable film stripper.

Another object of the invention is to provide an improved pad roller for retaining the film upon the driving sprockets which is held definitely in position but which is easily adjustable.

Another object of the invention is to provide a soundhead which will magnetically and electrostatically shield within itself the transformer used in conjunction with the photoelectric cell.

Another object of the invention is to provide a soundhead wherein the driving motor is built into the soundhead.

Another object of the invention is to provide a soundhead with the motor built thereinto with means for preventing stray magnetic fields and induced currents from the motor from permeating the soundhead.

Another object of the invention is to provide means for manually actuating the driving mechanism for purposes of adjustment, etc.

In the drawings,

Fig. 3 is a schematic diagram of the arrangement of the mechanical portions of the apparatus.

Fig. 4 is a perspective view of the optical system.

Figs. 8, 9 and 10 show details of the pressure roller which holds the film upon the drum.

Figs. 11 and 12 show the adjustable socket for the exciter lamp.

Figs. 13 to 16 show the details of the pad rollers, and

Fig. 17 shows the film stripper.

Figure 1:
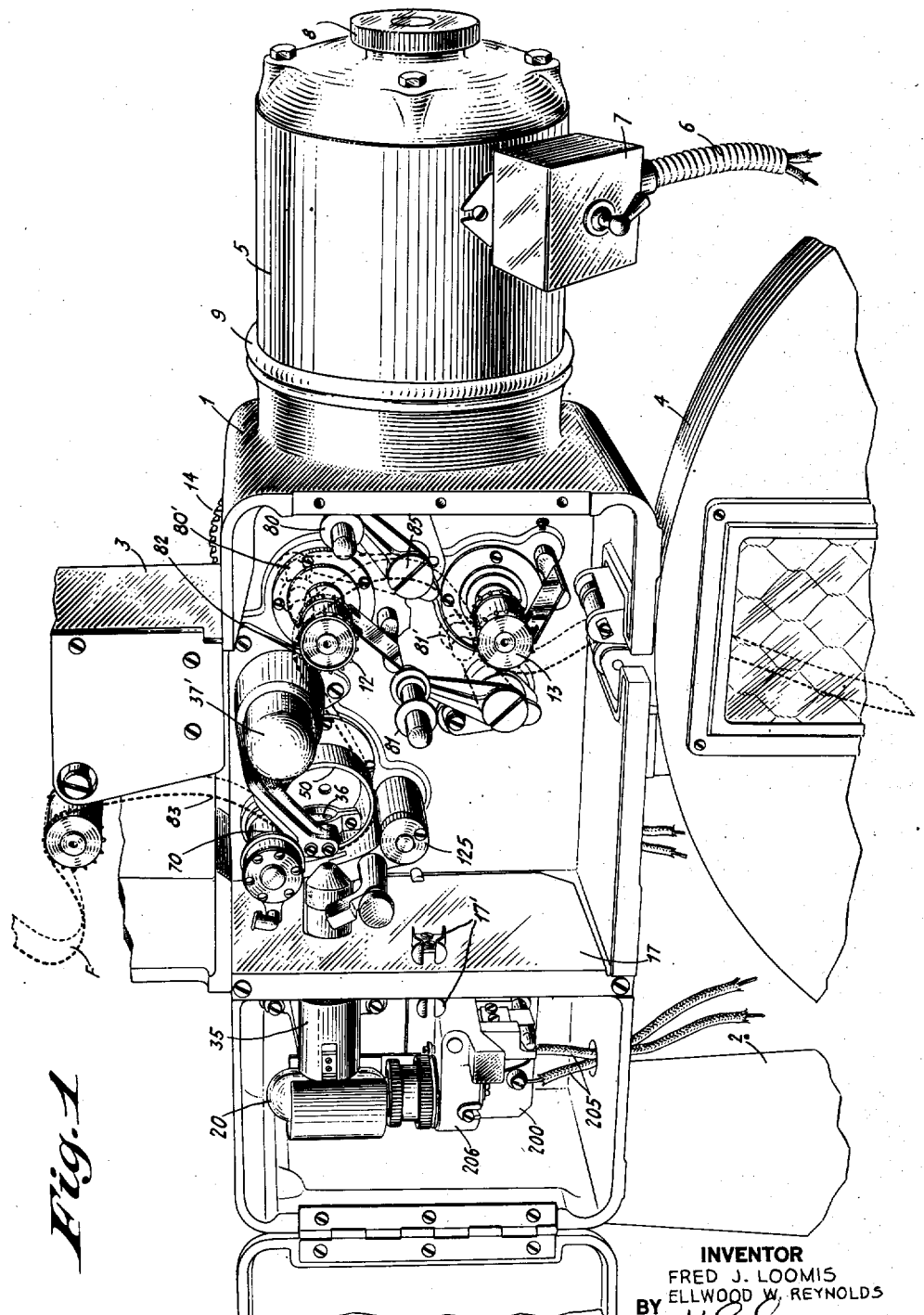
Fig. 1 is a view from the front or operating side with the doors open or removed.

We will first give a general description of the apparatus with particular reference to Figs. 1 to 5, and then specific descriptions of the several details thereof.

The soundhead includes a body member or casing 1 which is attached to and supported by the stand 2, which stand is of a type more or less customarily used for supporting motion picture projectors. Upon the body of the soundhead is mounted the motion picture projector indicated at 3 in Fig. 1 and through which the film F passes to the soundhead.

At the bottom of the soundhead is mounted the usual take-up reel 4. At the righthand end of the soundhead is mounted the driving motor 5 which serves to drive the soundhead and the motion picture projector in synchronism and which is provided with the usual supply cable 6 and the control switch 7. The shell of the motor 5 is fitted in an appropriate manner, hereinafter described in more detail, in the body of the soundhead 1 and the shaft of the motor extends directly into the soundhead to drive the mechanism thereof.

Inasmuch as there are no parts of the mechanism available by which the operator may rotate it by hand, a knob 8 is provided upon the outer end of the motor shaft for the purpose of rotating the mechanism slowly as, for example, to ascertain adjustment of various parts, etc. The motor shell which is subjected to strong magnetic fields is separated from the cast-iron body of the soundhead 1 by an aluminum ring 9. This aluminum ring effects a considerable magnetic separation between the shell of the motor 5 and the soundhead body 1 and also serves to short-circuit any eddy currents in the shell 5, and thereby prevents the setting up of magnetic fields in the body 1 of the soundhead from the effects of the motor. This prevents noises from being produced in the photoelectric equipment from the action of the motor 5.

The motor 5, as shown in Fig. 3, carries upon its shaft the worm 10 which cooperates with the bronze worm-wheel 11 to drive the main shaft of the machine. This main shaft carries the constant speed sprocket 12, and also carries the driving gear 14. The constant speed sprocket 12 serves to draw the film at a uniform speed past the reproduction point and the gear 14 drives the gear fibre 15, which in turn drives the hold-back sprocket 13. The hold-back sprocket 13 prevents irregularities in the motion in the take-up reel from being carried back to the film at the reproduction point. The main shaft of the machine also carries the gear 14' (see Fig. 3) which drives the fibre gear 16 of the motion picture projector. It will be apparent that the worm drive 10, 11, due to the high speed of the motor and the momentum of the armature thereof, and the irreversible action of the worm, not only causes the sprocket 12 to be driven at a perfectly uniform speed but also prevents irregularities in the action of the motion picture machine from reacting through the gears 16 and 14' upon the sprocket 12. The gearing runs in oil in an oil-tight compartment. When the projector and soundhead assembly is tilted downwardly, as is necessary in many theatres, there is a tendency for oil to run out of this compartment along the motor shaft. We accordingly provide an oil-tight seal around the shaft at the partition between the said compartment and the motor, at the point marked 5' in Fig. 3.

A partition 17 is provided in the body of the soundhead adjacent the end opposite the motor, and in the compartment thus formed, is located the exciter lamp 20 which is mounted in the socket shown in detail in Figs. 11 and 12. Doors are hinged at opposite ends of the casing and meet at the edge of the partition 17 which carries upon its opposite faces the catches 17' for retaining the doors in closed position.

Figure 2:
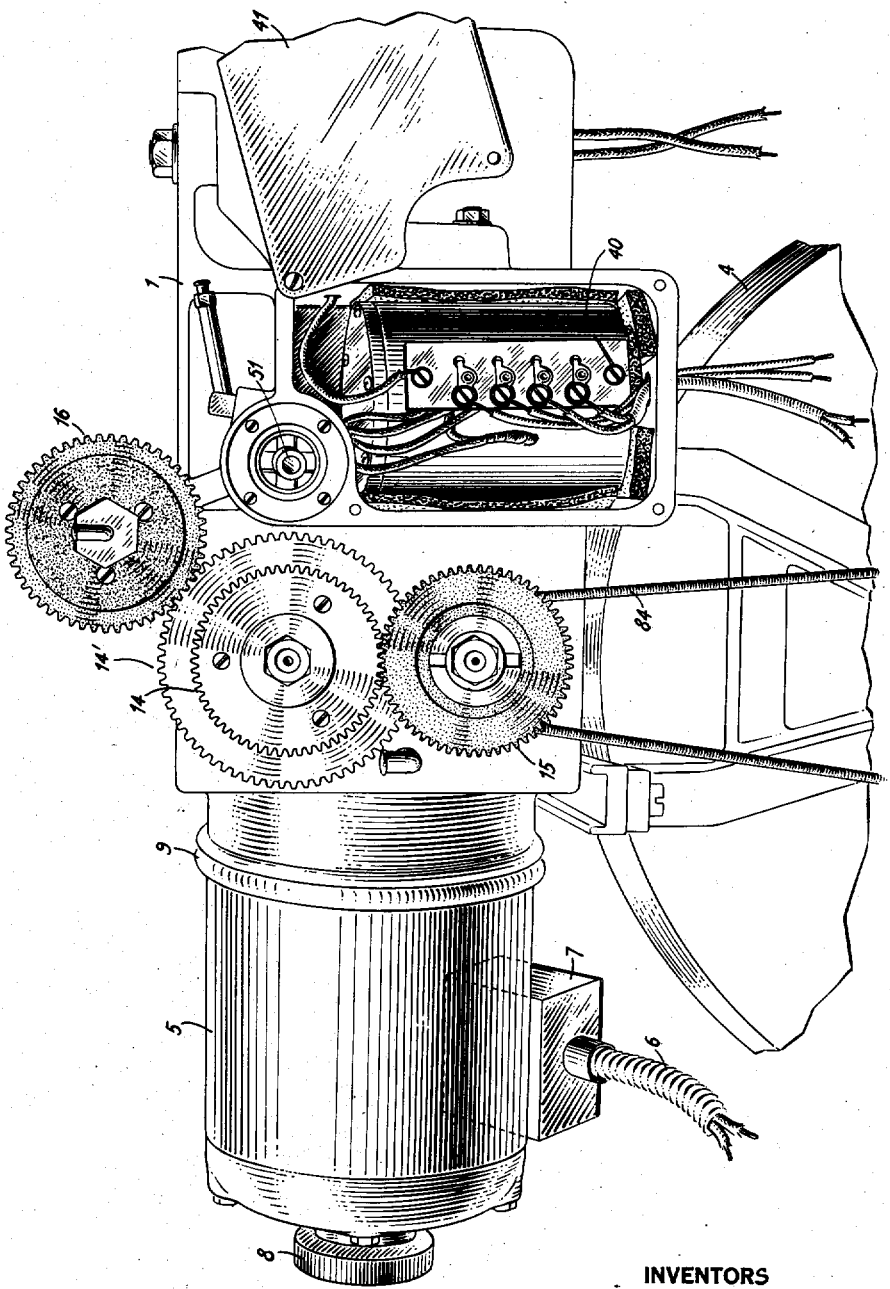
Fig. 2 is a view from the rear of the soundhead with the damping unit removed.

The optical system indicated at 35 collects light from the exciter lamp 20 and focuses it upon the film F at the reproduction point P in the form of a fine bright line. Light diverging from this focus after passing the film F is rendered appreciably less diverging and is deflected by the optical element 36 which is a prismatic convex lens and is deflected thereby to the photocell 37, which in turn is enclosed within the housing 37'. Current from the photocell passes to the transformer 40, which as shown in Fig. 2, is housed in a recess in the back of the soundhead and this recess is closed by a heavy metallic member 41. The transformer is preferably mounted, as shown, on sponge rubber, felt, or other vibration absorbing material, and the entire enclosure thereof within the middle of the soundhead serves as an effective magnetic and electrostatic shield. The output from this transformer is carried in the usual manner to the amplifiers and other auxiliary equipment.

Figure 5:
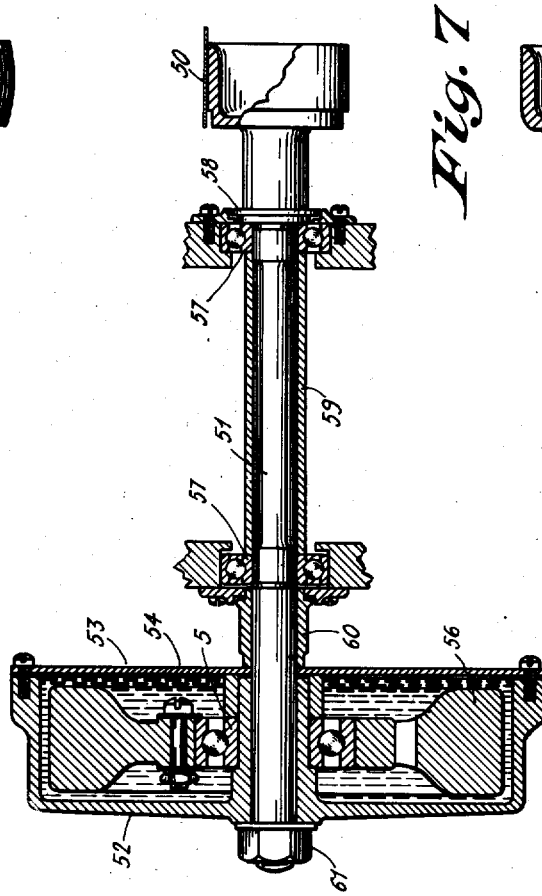
Fig. 5 is a sectional view of the film drum unit showing the damping mechanism.

In accordance with the aforesaid Reynolds application above referred to, the motion of the film is rendered uniform at the reproduction point P through the cooperation with the device shown in Fig. 5 for damping out the vibrations.

As shown in detail in Fig. 4, the soundtrack portion of the film overhangs the edge of the drum 50 by which it is supported, extending otherwise unsupported into the path of the light, as described and claimed in Cawley Patent 1,825,438, patented September 29, 1931; and this wheel is driven by the film as described and claimed in Cawley Patent 1,825,439 of the same date.

As shown in Fig. 5, the drum 50 is made integral with the shaft 51 and this shaft carries upon its other end the light hollow casing 52 provided with a collar 53. This casing is preferably made of magnesium or of an aluminum alloy, or the like, in order to secure the minimum possible weight; and the casing is filled with an appropriate fluid 54, such as oil.

We have found magnesium alloy to be particularly desirable since it is both very light and extremely rigid, and it is capable of being very accurately machined so that a uniform and predetermined cooperative relation may be secured between the casing and the member 56.

Mounted upon the hub of the casing is the ball-bearing 55 supporting the massive member 56 which rotates freely on the ball-bearing. This member 56 is not a flywheel in any ordinary sense of the term, since it is not integral with the shaft 51 and does not directly control the rotation thereof. The member 56, as described in the said Reynolds application, is mechanically connected with the casing 52 and the shaft 51 only through the viscous effect of the fluid 54.

Upon the starting of the rotation of the device through traction of the film upon the drum 50, the casing 52 immediately comes up to full operating speed, but it requires an appreciable length of time for the member 56 to reach the same speed due to the large mass thereof relative to the viscosity of the fluid 54. Thereafter when there is any change in the rotational velocity of the drum 50, the massive member 56 has a corresponding reluctance to follow such change in velocity and exerts a counter-torque opposing such change in velocity through the viscous medium 54. Since there is no direct mechanical connection and no elasticity providing a restitutional torque between these parts, any such controlling action of the member 56 is critically damped and oscillation is impossible.

As further described in said Reynolds application, full advantage is taken of this property of the mechanical damper by mounting the shaft 51 upon ball-bearings 57 to provide a minimum of friction. The drum 50 and the shaft 51 are preferably in the form of a single forging, and a shoulder 58 is formed adjacent the drum 50. One of the bearings 57 is placed firmly against this shoulder, the sleeve 59 of predetermined length is then slipped over the shaft against the bearing, the second bearing 57 is placed upon the shaft, then the collar 60 serving to space the damping member 52 from the bearing 57, and then the damping unit, the entire assembly being held rigidly in position by the nut 61 which is placed upon the threaded end of the shaft.

It will be apparent that this provides an extremely accurate and economical mode of assembling this unit, which is required to be extremely accurate, as any inaccuracies in its construction will cause corresponding inaccuracies in reproduction of sound. At the present film speeds of eighteen inches per second and commercial sound reproduction to frequencies of 10,000 cycles per second and over, an irregularity of motion of the periphery of the drum 50 of the order of 1/10,000 of an inch is readily noticeable and the construction here described succeeds in economically attaining that degree of accuracy.

As described in the said Reynolds application and as shown in Fig. 1, the film F passing outwardly from the projector 3 is maintained in contact with the drum 50 by the pressure roller indicated generally at 70. It will be noted that this pressure roller is in such a position against the drum 50 that the film is flexed through a considerable angle in passing from the projector to the surface of the roller 50; and likewise, where the film passes over sprocket 12 it is pressed against the back rather than the top of the sprocket by the pad roller 80 in the position shown in dotted lines at 80'. The pad roller 80 causes the film to tend toward a vertical position at the sprocket 12 and, due to the elasticity of the film, a fairly large and springy loop is formed above the construction 12 at the point 82 while a corresponding loop is formed above the drum 50 at the point 83. Due to the fact that the drum 50 rotates very freely in the ball-bearings before described, the flatwise elasticity of the film at 82 is sufficient to cause the rotation of the drum, and since any tendency toward irregularity of motion of the drum 50 is driven in the manner before described, the loop 82, likewise serves to absorb any irregularities which might be imparted to the film by the sprocket teeth.

The loop 83 likewise absorbs any irregularities in the motion of the film as it is delivered from the projector.

As is well known, the motion of the take-up reel is irregular, due to slippage of the friction drive which in the present case is accomplished through the belt 84 (Fig. 2) and these irregularities may be prevented from reacting upon the film at the sprocket 12 by the sprocket 13 upon which the film is held by the pad roller 81 shown in dotted lines in the operating position at 81', a free loop of film being left between the sprockets 12 and 13 at 85. The effectiveness of the film loop and damping unit is such that a holdback sprocket is not necessary with this apparatus with film in good condition. It is useful, if the sprocket-holes are badly damaged or otherwise in such condition as to render slippage on the sprocket 12 probable.

It will be apparent that the foregoing construction provides a unique arrangement of parts which is capable of securing the desired result in a highly satisfactory manner. The new and important features described below cooperate to improve the construction and operation of the apparatus.

*Pressure roller*

It is necessary, in the foregoing construction, that the pressure roller indicated generally at 70 shall hold the film firmly against the film drum without slippage; that it rotate so freely as to avoid any interference with the operation of the drum; and that it guide the film laterally to maintain it exactly in position between the optical system and the photocell. This portion of the device is shown in Figs. 8 to 10 inclusive.

The roller surface 100 is formed from a fine grade of felt, and after being placed upon the combined spindle and clamping ring 101 is fastened rigidly thereupon by the member 102 and thereafter ground to an accurate circular form. The member 101 is mounted upon a shaft 103 which extends entirely through the rotating portions of the unit. This shaft is carried in ball-bearings 104 and 105 which are mounted in a bracket hereinafter described and protected by the collar members 106. Mounted firmly upon the shaft and abutting against the collar thereof is the guide member 107 which serves to guide the edge of the film adjacent the soundtrack. The member 107 is separated from the adjacent ball-bearing 104 by the spacer member 108 which, with the assistance of the nut 109, holds the member 107 firmly against the shoulder on the shaft 103.

The member 101 has fitted firmly thereupon a member 110 which corresponds in general appearance and function to the member 107, but the entire unit comprising the members 100, 101, 102 and 110 is slidable longitudinally on the shaft 103 and is pressed toward the member 107 by the spring 111. The spring 111 is fixed in position by the collar 112 which fits against the shoulder on the shaft 103 and is held thereagainst by the nut 113 and the inner ring of the ball-bearing 105. The spacing of the members 107 and 110 is so chosen that they will be slightly separated when a film of the minimum usable width is between them, and will of course be separated a greater distance by wider film. Due to the long bearing of the member 101 upon the shaft 103, the members 107 and 110 will always remain in exact parallelism, while the entire unit will rotate freely upon the ball-bearings 103 and 105.

The bearings 104 and 105 are supported in the bracket member 115 which has the ring members 116 and 117 formed integral therewith. This bracket member is pivoted at 118 in a second bracket member 119. This pivoted joint, as shown in Figs. 8 and 9, is capable of only a very slight movement and serves to permit a slight vertical movement of the roller 100 in engaging the film upon the drum 50. The drum 100 is maintained in a firm but yielding engagement with the drum 50 by means of the spring 120 and the ball 120' shown in Fig. 8, in which figure they urge the bracket 115 toward the right.

The bracket 119 is mounted upon the pin 121 which is a "press" fit in the center plate of the soundhead due to the shaping of the end 122 to fit an appropriately-diametered hole in the center plate, in order that the pin 121 may be maintained accurately perpendicular to the said center plate without the inaccuracies ordinarily resulting from the tapping of a hole, or the threading of the end of the pin to fit into the tapped hole. The collar 123 fits snugly against the center plate, and against this collar bears the spring 124 which fits, as shown, into a recess in the member 119 and thrust the member 119 toward the outer end of the pin and against the member 125. The member 125 is threaded upon the outer end of the pin 121 so that it may be adjusted longitudinally thereon, is split and provided with a lock-screw 126 as shown. Lateral adjustment of the side guides 107 and 110 relative to the roller 50 is accomplished by loosening the screw 126 and rotating the member 125 until the guides 107 and 110 are in the proper positions when the member 125 is again locked by tightening the screw 126.

It is, of course, necessary to lock the pressure roller in operative position against the roller 50, and to remove it from that position. Locking is accomplished by means of the bolt 127, which is retained by an appropriate aperture in the center plate, or by an adjustable plate secured thereupon. The bolt 127 is urged toward the center plate by the spring 128 and may be pulled outwardly by the knob 129. A thumb piece 130 is also provided. To open the pressure roller the knob 129 is pulled outwardly, whereby the bolt 127 is removed from its aperture, and the pressure roller is permitted to drop back, while to close it into operating position the assembly is merely rotated by pressure of the member 130 until the bolt 127 snaps into the appropriate aperture, when the entire unit is locked in operating position. In operating position the roller is raised slightly against the pressure of the spring 120', which then maintains it in contact with the film upon the film drum.

*Film drum*

We have found that if the film is operated over a flat-surfaced drum at the sound take-off point with the soundtrack of the film overhanging the edge of the drum, and the remainder of the film in contact with the drum surface, the film has a tendency to creep sideways. We avoid this as shown in Fig. 5, by providing a recessed portion at the opposite end of the drum so that the drum is in contact with a median portion of the film. That is, a portion of the film at the inner edge is left free to overhang, and is of the same width as the portion overhanging the outer end of the drum. This causes the film to run perfectly straight and with a minimum of pressure against the side guides 107 and 110.

Figure 6:
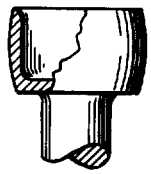
Figs. 6 and 7 show alternative forms of the film drum.
Figure 7:
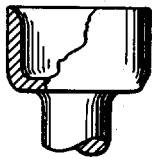

Alternative forms of film drum are shown in Figs. 6 and 7. In Fig. 7 the drum is slightly rounded at the inner edge, while in Fig. 6 the drum is shown slightly "crowned" in a manner somewhat similar to the crowning of a pulley for a flat belt, but with the center of the crown near enough to the outer edge of the drum to cause the film to run with the proper amount of overhang. These latter two forms are useful but at present we prefer the forms shown in Fig. since the operation thereof seems to be independent of the different shrinkages occurring at the middle and the edges of the film.

*Exciter lamp socket*

The construction of the exciter lamp socket is shown in detail in Figs. 11 and 12.

It is necessary, in photophonographic apparatus, that the exciter lamp be held rigidly in position, that it be adjustable vertically to align it with the optical system, that it be provided with adequate and non-microphonic contacts that it be held firmly against rotation during vertical adjustment, and that it be instantly replaceable by another pre-adjusted lamp. We have attained all these results by the construction shown.

A base plate 200 of insulating material is provided, which is attached to the center plate of the soundhead as shown in Fig. 1. Projecting from this base-plate are two round pins 201 and 202 provided with collars 203 and 204. The pins are insulated from each other by the base-plate and the feed-wires 205 (Fig. 1) are electrically connected to the pins.

A body member 206 is provided, having an aperture extending therethrough adapted to cooperate with the pin 201. A block of insulating material 207 is attached to the bottom of the member 206 and is provided with a groove at its bottom adapted to cooperate with the pin 202. It will be apparent from Fig. 12 that substantially the entire weight of the unit lies to one side of the vertical plane of the pins 201, 202 and the insulating block 207 is thereby pressed firmly against the rod 202. A contact spring 208 is carried by the block 207 and presses firmly against the opposite side of the rod or pin 202.

When the members 206 and 207, forming a unit, are slid upon the rods 201 and 202, they can be slid toward the base-member 200 until they strike the collars 203 and 204, and these collars thereby accurately determine the position of the socket laterally of the soundhead while the rods determine the position and orientation thereof in all other planes.

The outer end of the rod 202 is, as shown, made slightly larger than the remainder thereof so that the pressure of the spring 208 thereupon tends to maintain the body member 206 firmly against the collar 203.

The rear portion of the base-member 200 consists of a felt pad 200', which serves to absorb any vibration which might otherwise be imparted to the socket from the mechanism of the soundhead or projector and produce microphonic noises from the lamp.

The base of the lamp itself is held in the chuck member 209, which is provided with yieldable jaws at its top. The lower portion of the chuck is round and is vertically slidable in a hole in the member 206 in which it fits snugly. Slots 210 are provided in the chuck jaws, and the pins extending from the sides of the lamp base fit into these slots and prevent rotation of the lamp base in the chuck. A clamping nut 211 is fitted to the upper portion of the chuck for forcing the jaws inwardly against the lamp base.

The chuck is prevented from rotating in the member 206 by the screw 212, which is threaded into the chuck as shown in Fig. 12 and is movable vertically in a slot as shown in Fig. 11. After the chuck has been adjusted to the proper vertical position, it is clamped by tightening the screw 212 against the member 206.

Vertical adjustment of the chuck is accomplished by rotation of the nut 213. This nut, as shown in Fig. 12, fits into a recess in the member 206 and is held therein as shown in Fig. 11 by the screw 214 which fits over the collar 215. Since the chuck 209 is threaded to fit the nut 213, it will be apparent that rotation of the vertically-fixed nut will result in vertical movement of the chuck.

Within the chuck at the bottom there is provided an insulating bushing 216, within which a contact member 217 is freely slidable, being pressed upwardly by the spring 218 which maintains it firmly in contact with the contact-pin on the bottom of the lamp. A connection strip 219 is attached to the bottom of the contact member 217 by a screw 220 and is connected to the spring 208 by a bolt 221, thereby establishing an electrical circuit to the contact 217 from the rod 202, while the base of the lamp is connected to the rod 201 by the chuck and the body member 206.

A knurled knob 222 is provided by which the body member may be grasped for removal or replacement.

It will be apparent that one or more extra lamps may be adjusted in as many sockets, and if a lamp fails during operation of the apparatus, it requires but an instant to remove the lamp and socket and slide another pre-adjusted lamp into place.

A shield 223 is provided to prevent stray light.

Pad roller assembly

The pad roller assemblies, indicated generally at 80 and 81 in Fig. 1, are shown in detail in Figs. 13 to 16.

It is necessary that these rollers should definitely maintain the film upon the sprockets, but, on the other hand, it is undesirable that they should touch the film except when necessary to perform their function. It is accordingly customary to adjust these rollers so that they are spaced from the surface of the sprocket about twice the thickness of the film. There is a possibility that splices may be even thicker than this, and it is therefore necessary to hold the pad rollers not only definitely but yieldably in this position.

It is further necessary that the rollers be instantly releasable for the purpose of threading the machine; and we accomplish all these results by the construction shown.

The roller itself is indicated at 250, in Figs. 13 and 14, and is freely rotatable upon a shaft fixed in the movable arm 251 and carrying the knurled knob 252 at its outer end. The arm 251 is pivoted upon the shouldered screw 253, which is fitted into the center plate of the machine, the shoulder 253' fitting against the center plate and establishing proper clearance beneath the head of the screw from free motion of the arm 251.

The plate 254 lies between the arm 251 and the center plate, and is held against rotation about the screw 253, which passes through the hole 257 (Figs. 15 and 16) by the screw 255 which passes through the slot 256. The slot 256 is arcuate in shape, and the plate 254 may be angularly adjusted by a corresponding amount about the screw 253.

As shown in Figs. 15 and 16, both sides of the plate 254 are alike, so that it may be used either "right-handed" or "left-handed", as rendered desirable by the location of surrounding parts.

The extreme limits of motion of the arm 251 are determined by the ends of the arcuate recess 258 into which the round pin 259 fits, the pin 259 being a "force fit" in a hole in the arm 251.

The arm is held at either end of its travel by the ball 261 and the coil spring 262. The plate 254 is provided with holes 260 into which the coil spring tends to force the ball, but these holes are so located that when the pin 259 is at either end of its travel in the recess 258 the ball 261 is not quite seated in the corresponding hole, and the arm is thereby held firmly in position.

Since the holding, locating, and adjusting means just described function equally well at either end of the travel of the arm 251, either end may be used as the sprocket position; and in addition the plate 254 is reversible as before described.

Film stripper

Film sometimes has a tendency to cling to the sprocket teeth, and it is accordingly necessary to provide members extending past the teeth to a point adjacent to the surface of the sprocket, for stripping the film from the teeth.

Heretofore, the film strippers have usually been formed of several parts secured together by screws. We have found such constructions to be expensive and unreliable, and have accordingly devised the stripper shown in Fig. 17.

A rod 300 is provided, the round end of which is adapted to fit tightly into a hole provided therefor in the center plate of the apparatus. The other end of the rod is cut away as shown at 301 to provide a flat surface having a width substantially equal to the diameter of the rod.

A plate 302 is provided, and this is cut away at 303 to fit around the sprocket teeth, the edges 304 being in close proximity to the face of the sprocket.

The plate 302 is spot-welded at 305 to the flat surface of the rod 300, thereby providing a construction which is not only less expensive than that of the prior art, but which cannot be shaken apart or out of adjustment by vibration or by the impacts of film thereagainst.

Having described the construction and operation of our apparatus and the advantages thereof;

We claim:

1. A soundhead comprising a unitary casing having therein a light source, an optical system and a photoelectric sound reproducing means, and a removable partition extending laterally of said casing at the said optical system, one end of said casing comprising an end-bell of the motor therefor.

2. A soundhead comprising a unitary casing having therein a light source, an optical system and a photoelectric sound reproducing means, and a removable partition extending laterally of said casing between the light source and the sound reproducing means, one end of said casing comprising an end-bell of the motor therefor.

3. A soundhead comprising a unitary casing having therein a light source, an optical system and a photoelectric sound reproducing means, a removable partition extending laterally of said casing at the said optical system, doors hinged at opposite ends of the said casing and meeting at the said partition, and door catches mounted upon the said partition.

4. A soundhead comprising a metallic casing, electrical sound reproducing apparatus within said casing, a transformer connected to the said electrical sound reproducing apparatus, and a separate compartment integral with said casing housing and shielding the said transformer.

5. A soundhead comprising a metallic casing, electrical sound reproducing apparatus within said casing, a transformer connected to the said electrical sound reproducing apparatus, a separate compartment integral with said casing housing and shielding the said transformer, and vibration-absorbing material between the walls of the compartment and the said transformer.

6. A soundhead comprising a casing housing a sound reproducer, a motor mounted longitudinally upon the said casing, whereby a portion of the said casing forms one of the end bells of the motor, and gearing in co-operative relation with the shaft of said motor and housed within the said casing for driving a sound record through the said soundhead.

7. A soundhead comprising a casing housing a sound reproducer, a motor mounted longitudinally upon the said casing, whereby a portion of the said casing forms one of the end bells of the motor, gearing in co-operative relation with the shaft of said motor and housed within the said casing for driving the film through the said soundhead, and an oil-tight seal around said shaft between said gearing and said motor.

8. A soundhead comprising a casing housing a sound reproducer, a motor mounted longitudinally upon the said casing, whereby a portion of the said casing forms one of the end bells of the motor, gearing in co-operative relation with the shaft of said motor and housed within the said casing for driving the film through the said soundhead, and means for manually rotating the motor shaft.

9. A soundhead comprising a casing housing a sound reproducer, a motor mounted longitudinally upon the said casing, whereby a portion of the said casing forms one of the end bells of the motor, gearing in co-operative relation with the shaft of said motor and housed within the said casing for driving a film through the said soundhead, and a non-magnetic ring of electrically conducting material separating the shell of the said motor from the said casing.

10. A soundhead comprising a casing housing a sound reproducer, a motor mounted longitudinally upon the said casing, whereby a portion of the said casing forms one of the end bells of the motor, gearing in co-operative relation with the shaft of said motor and housed within the said casing for driving the film through the said soundhead, and a non-magnetic ring of electrically conducting material separating the shell of the said motor from the said casing, the said ring being of sufficient thickness and cross-section to effectively separate the magnetic fields of the motor from the casing and to short-circuit eddy currents therein.

11. Photoelectric sound reproducing apparatus comprising a drum adapted to support the film at the reproduction point with the soundtrack portion of the film overhanging the edge thereof, means for directing a fine line of light upon the soundtrack at the reproduction point, light responsive means mounted exterior to said drum at the opposite side thereof from the said reproduction point, and means including converging lens and prism elements for directing light passing through the film upon the light responsive means.

12. Photophonographic apparatus comprising a smooth drum adapted to support a sound record film with the soundtrack portion thereof overhanging the edge of said smooth drum, and sound reproducing means in co-operative relation to the soundtrack position, the said smooth drum being reduced in diameter beneath the other edge of said film to such an extent that the film is substantially equally supported upon both sides of its median line.

13. Means for causing an elastic film to travel past a predetermined point at a uniform velocity, comprising a rotary member for supporting the film at the said point, means for drawing the film over the rotary member, means for maintaining the film curved in a free loop between the first two means, a flywheel freely and independently rotatable upon the shaft of said rotary member, and a fluid-filled container composed predominantly of magnesium rigidly connected to said rotary member and enclosing the flywheel for yieldably and aperiodically coupling the flywheel to the said rotary member.

14. Means for causing an elastic film to travel past a predetermined point at a uniform velocity, comprising a rotary member for supporting the film at the said point, means for drawing the film over the rotary member, means for maintaining the film curved in a free loop between the first two means, a flywheel freely and independently rotatable upon the shaft of said rotary member, and a fluid-filled container rigidly connected to said rotary member and enclosing the flywheel for yieldably and aperiodically coupling the flywheel to the said rotary member, the said container having the minimum mass consistent with the required mechanical rigidity.

15. Means adapted to cooperate with a rotary member for precluding or diminishing irregularities in the rotary motion thereof, comprising a circular magnesium alloy casing in co-operative rotational relation to said rotary member, a flywheel freely rotatable within the said casing, and a viscous fluid substantially filling the space between the said casing and the said flywheel.

16. Photophonographic apparatus comprising a drum adapted to support the film at the reproduction point with the soundtrack portion of the film overhanging the edge thereof, a shaft mounted upon anti-friction bearings and supporting the said drum for rotation, a flywheel freely rotatable upon the said shaft, and an oil-filled magnesium casing rigidly secured to the said shaft and enclosing the said flywheel, whereby the flywheel is mechanically coupled to the said shaft by the oil only.

17. Photophonographic apparatus comprising a drum adapted to support the film at the reproduction point with the soundtrack portion of the film overhanging the edge thereof, a shaft mounted upon anti-friction bearings and supporting the said drum for rotation, a flywheel freely rotatable upon the said shaft and an oil-filled magnesium alloy casing rigidly secured to the said shaft and enclosing the said flywheel whereby the flywheel is mechanically coupled to the said shaft by the oil only, the portion of the assembly comprising the drum, shaft and casing having the minimum practical rotational inertia.

18. Photophonographic apparatus comprising means for pulling a sound record film past the reproduction point, a center plate supporting said means, a vibration absorbing pad mounted upon said center plate, a base plate supported upon said vibration absorbing pad on the opposite side thereof from the said center plate, and a pair of electrically conducting rods extending perpendicularly from said base plate for supporting a lamp socket.

19. Photophonographic apparatus comprising means for pulling a sound record film past the reproduction point, a center plate supporting said means, a vibration absorbing pad mounted upon said center plate, a base plate supported upon said vibration absorbing pad on the opposite side thereof from the said center plate, a pair of electrically conducting rods extending perpendicularly from said base plate, a lamp socket slidable upon said rods, and spring means co-acting with one of said rods for maintaining the said socket in operating position.

FRED J. LOOMIS.
ELLWOOD W. REYNOLDS.